(12) United States Patent
Shaffer et al.

(10) Patent No.: US 6,700,969 B1
(45) Date of Patent: *Mar. 2, 2004

(54) METHOD AND APPARATUS FOR PROTECTING CALL PRIVACY ACROSS TELECOMMUNICATION NETWORKS

(75) Inventors: Shmuel Shaffer, Palo Alto, CA (US); William Joseph Beyda, Cupertino, CA (US)

(73) Assignee: Siemens Information & Communication Networks, Inc., Boca Raton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/419,363

(22) Filed: Oct. 15, 1999

(51) Int. Cl.[7] .................................................. H04M 3/42
(52) U.S. Cl. ............................. 379/211.01; 379/202.01
(58) Field of Search ........................... 379/219, 220.01, 379/221.01, 211.02, 210.02, 202.01, 212.01, 142.02

(56) References Cited

U.S. PATENT DOCUMENTS

| | | | |
|---|---|---|---|
| 5,319,702 A | * 6/1994 | Kitchin et al. | 379/145 |
| 5,425,097 A | 6/1995 | Pula | 379/396 |
| 5,521,969 A | * 5/1996 | Paulus et al. | 379/142.02 |
| 5,553,128 A | 9/1996 | Grimes | 379/211.02 |
| 5,568,540 A | 10/1996 | Greco et al. | 379/89 |
| 5,579,383 A | * 11/1996 | Bales et al. | 379/207.1 |
| 5,615,253 A | * 3/1997 | Kocan et al. | 379/189 |
| 5,742,596 A | 4/1998 | Baratz et al. | 370/356 |
| 5,926,533 A | * 7/1999 | Gainsboro | 379/188 |
| 5,995,607 A | * 11/1999 | Beyda et al. | 370/260 |

FOREIGN PATENT DOCUMENTS

| | | |
|---|---|---|
| EP | 0 439 927 A2 | 8/1991 |
| EP | 1 011 252 A2 | 6/2000 |

OTHER PUBLICATIONS

U.S. patent application Ser. No. 09/211,994, Shaffer et al., filed Dec. 14, 1998.

* cited by examiner

Primary Examiner—Ahmad F. Matar
Assistant Examiner—Quynh H. Nguyen (57) ABSTRACT

A method and an apparatus for protecting call privacy across telecommunication networks allow a calling party of a first telecommunication network to control the privacy of a telephone call to a called party of a second telecommunication network. This is achieved by selecting among a group of privacy options that represent varying degrees of privacy, assigning each of the selected privacy options to the call, and enforcing the selected privacy options within the second telecommunication network, thereby eliminating the need for external enforcement. The privacy options selected for the call limit the ability of a called party to manipulate the call. For example, the privacy options may prevent the called party from forwarding the call, transferring the call, conferencing the call, and/or listening to the call via a hands-free speaker phone. In an additional aspect of the invention, selected privacy options, such as preventing call transferring, preventing call conferencing, and preventing voice data from being listened to via a hands-free speaker, are transferred to any voicemail messages that are generated as a result of the call made by the calling party.

18 Claims, 5 Drawing Sheets

METHOD AND APPARATUS FOR PROTECTING CALL PRIVACY ACROSS TELECOMMUNICATION NETWORKS

BACKGROUND OF THE INVENTION

The invention relates to telecommunication networks and more particularly to ensuring the privacy of communications made across telecommunication networks.

DESCRIPTION OF THE RELATED ART

Privacy is an important issue for many users of telecommunication equipment. The issue relates to ensuring that only the intended parties in a conversation carried across telecommunication networks are connected to receive the voice information. Privacy is of particular concern in corporate environments where the parties of the telephone calls are using telephones supported by different telecommunication networks and where multifunction telephone systems allow calls to be forwarded, transferred, or conferenced. For example, the privacy of a telephone call can be breached when a caller A at a calling communication terminal of a first telecommunication network believes he/she has contacted a called party B at a target communication terminal of a second telecommunication network, but the call has seamlessly been forwarded or transferred to a party C at a third communication terminal. Because caller A is unaware that he/she has contacted the wrong party, the caller may provide information to party C that is not intended for party C. In another example, caller A, located in a first telecommunication network, may not want certain sensitive information to be heard by other parties within earshot of called party B, located in a second telecommunication network. However, without caller A's knowledge, the called party B may conduct his/her end of the conversation through a hands-free speaker phone which projects the conversation to the surrounding environment, potentially breaching the privacy of the call.

Many of the same privacy concerns related to real-time telephone conversations exist with respect to voice messaging systems that are commonplace in multifunction telephone systems. For example, in most messaging systems a voicemail message intended to be heard only by a particular party may be transferred to unintended parties or may be overheard when the intended party listens to the stored message using a speaker phone. U.S. Pat. No. 5,568,540 to Greco et al. describes a privacy feature which prevents voicemail messages identified as private from being forwarded or copied when the voicemail messages originate from calls that are connected to a specific Private Branch Exchange (PBX) via the public switched telephone network (PSTN). Although the privacy feature works well for its intended purpose, the feature of Greco et al. is limited to preventing a specifically marked voicemail message from being forwarded or copied to anyone but the intended recipient. Greco et al. does not provide any other privacy options, such as protection against a message being overheard during replay via a speaker phone.

In view of the privacy concerns involved with telephone communications across telecommunication networks and in view of the limited privacy controls available in telephone systems, what is needed is a voice communications approach that offers improved privacy functions.

SUMMARY OF THE INVENTION

A method and an apparatus for protecting call privacy across telecommunication networks allow a caller at a calling communication terminal of a first telecommunication network to control the privacy of a telephone call to a called party at a target communication terminal of a second telecommunication network, by (1) enabling selection from among a group of privacy options that represent varying degrees of privacy, (2) assigning each of the selected privacy options to the call, and (3) enforcing the selected privacy options using the capabilities within the second telecommunication network, thereby eliminating the need for external enforcement. The privacy options selected for the call limit the ability of a called party to manipulate the call. For example, the privacy options may prevent the called party from forwarding the call, transferring the call, conferencing the call, and/or listening to the call via a hands-free speaker phone. Allowing the caller to control how freely the called party can manipulate an incoming call helps to ensure that the caller's privacy expectations are met. In an additional aspect of the invention, when a caller at the first telecommunication network calls a called party at the second telecommunication network and leaves a voicemail message, selected privacy options (e.g., preventing call transferring, preventing call conferencing, and preventing voice data from being listened to via a hands-free speaker) are transferred to any voicemail message that is generated as a result of the call. and a data server. Within the ToL network system, the communication terminals and the gatekeeper are configured to provide extended caller-initiated privacy options. Within the PBX network system, the communication terminals and the PBX are configured to provide extended caller-initiated privacy options.

In the first embodiment in which two ToLs are interconnected via a data network, one of the preferred operations of the caller-initiated privacy system is described for a caller A at a calling communication terminal which is supported by the first ToL system. Caller A intends to make a call to a target communication terminal which is supported by the second ToL system. To initiate the call, the caller accesses a call placement screen via the calling communication terminal. The caller then has the option of selecting among any combination of privacy options which are displayed on the call placement screen. Once the caller-initiated privacy options are selected, the call placement application generates and transmits a call set-up protocol message to the gatekeeper of the calling communication terminal, identifying the selected privacy options. After call set-up is complete, the call is initiated. The gatekeeper of the first telecommunication network then determines whether the second telecommunication network utilizes the same network protocol system as the first telecommunication network. If the gatekeeper of the first telecommunication network determines that the second telecommunication network utilizes the same network system, the gatekeeper, using an H.323 signaling command, sends the protocol message to the gatekeeper of the second telecommunication network. The gatekeeper of the second telecommunication network receives the call within the parameters dictated by the selected call privacy options and enforces the selected privacy options.

In the second and third embodiments in which gateways are required in order to provide protocol and addressing compatibility, after the caller-initiated privacy options are selected, the call placement application generates and transmits a call set-up protocol message to the gatekeeper of the ToL network system of the first telecommunication network, identifying the selected privacy options. The gatekeeper of the first telecommunication network then determines whether a conversion or encoding of the message is required. In the third embodiment, because the ToL and the PBX network systems utilize a different protocol scheme, the gatekeeper of the first telecommunication network sends the protocol message to the local gateway. The gateway of the first telecommunication network then translates and In a first embodiment, the call privacy systems in the first and second telecommunication networks are each embodied in a telephony-over-local area network (LAN), or ToL, communications system that enables real-time voice conversations over packet-based networks. The first ToL communications system and the second ToL communications system are interconnected through gatekeepers via a data network, such as the global communications network commonly referred to as the Internet. Preferably, each ToL system includes communication terminals, a gatekeeper, and a data server. The gatekeeper connected to the LAN provides the computer telephony functionality for the ToL system. The telephony functionality includes managing call control between communication terminals in one telecommunication network with communication terminals in another telecommunication network. In a preferred embodiment, the gatekeeper includes a messaging system with voicemail capability. As an alternative embodiment, the messaging system may be encompassed in other devices. The data server may provide access to traditional database information, such as financial records, manufacturing schedules, and/or customer information.

According to the first embodiment, data and voice information are passed from the communication terminals located in the first telecommunication network to the communication terminals located in the second ToL network system via the two gatekeepers. Within each ToL network system, the communication terminals and gatekeepers are configured to provide extended caller-initiated privacy options.

In a second embodiment, the gatekeepers of two or more ToLs are linked to the PSTN by gateways, so that the ToLs are able to communicate via the PSTN services. The individual ToLs may be identical to the ToLs described with reference to the first embodiment. Each gatekeeper enforces the privacy options within its ToL, but receives enforcement instructions from the other gatekeepers.

In a third embodiment, the first telecommunication network is a packet-based ToL communications system and the second telecommunication network is a circuit-switched network. The caller-initiated privacy options are implemented at the second network in a private branch exchange (PBX) communications system. The ToL network system of the first telecommunication network and the PBX network system are interconnected by gateways and gatekeepers via the PSTN. The ToL network system may be identical to the ToLs described with reference to the first embodiment. The PBX network system includes communication terminals, a gateway, a gatekeeper (PBX), converts the information in the protocol message to ensure compatibility with the PBX network system.

Still referring to the third embodiment, after the conversion of the protocol message, the gateway of the first telecommunication network embeds the new privacy protocol message inside an Integrated Services Digital Network (ISDN) user-to-user signaling command, which is transmitted to the gateway of the PBX network system. The gateway of the second telecommunication network receives the new privacy protocol message and relays the protocol message, containing the parameters dictated by the selected call privacy options, to the PBX of the second telecommunication network. The PBX then enforces the selected privacy options.

In each embodiment of the invention, the selected call privacy options of block-call-forwarding, block-call-transferring, and block-call-conferencing are wholly enforced by the gatekeeper or the PBX of the called party's telecommunication network, eliminating the need for external enforcement. The privacy option of blocking speaker phone use is enforced cooperatively between the gatekeeper or PBX located within the called party's telecommunication network and the respective target communication terminal. That is, the target communication terminals may be programmed to request permission from the gatekeeper or PBX of the target communication terminals to activate a speaker phone at the target communication terminal. A request to activate a speaker phone will be denied if the block-speaker phone-use option is active on the particular call. Enforcement of the selected privacy options is transferred to any message, such as a voicemail message, that is generated in response to the call.

Although the privacy option of blocking call forwarding was described in simple terms, the block-call-forwarding feature can be further enhanced. For example, the feature could be enhanced by allowing call forwarding only when permission is given by the caller of the calling communication terminal. Moreover, the gatekeeper or PBX at the second telecommunication network could return a message to the gatekeeper of the first telecommunication network identifying the third party to whom the call was forwarded, and then ask the caller whether the caller would like to continue the call and have the call forwarded to the third party. Furthermore, if the gatekeeper or PBX at the target communication terminal does not support this feature or any privacy option feature, the gatekeeper or PBX will not recognize the privacy protocol message and will not acknowledge the message or will respond that the protocol message is 'unknown.' The calling communication terminal's gatekeeper can then inform the caller that the specific features are not supported by the second telecommunication network system and ask the caller whether the caller would like to connect the call to the target communication terminal.

DETAILED DESCRIPTION

Figure 1:
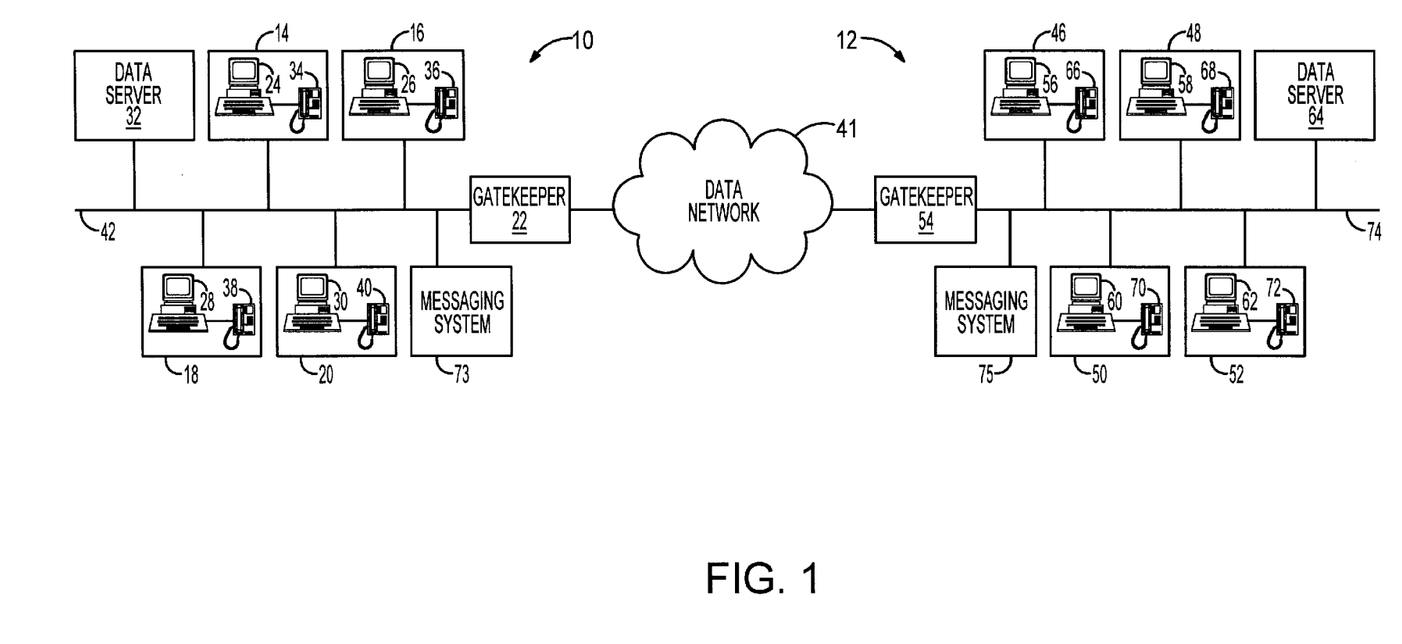
FIG. 1 is a depiction of two ToL network systems linked by a data network to provide privacy options in accordance with the invention.

FIG. 1 is a logical depiction of first and second network systems 10 and 12, respectively, which can be configured to operate in accordance with the invention. The preferred system in the first telecommunication network is a telephony-over-local area network (LAN) 42, or ToL, system that includes communication terminals 14,16,18, and 20, a gatekeeper 22, and a data server 32. The preferred system in the second telecommunication network is a telephony-over-LAN 74 system that includes communication terminals 46, 48, 50, and 52, a gatekeeper 54, and a data server 64. Each system simultaneously transfers non time-critical data (such as e-mail) and time-critical data (such as voice communications) to each other over a linking data network 41. The data network may be a Wide Area Network (WAN), such as the Internet.

The communication terminals 14–20 in the integrated voice and data ToL network system 10 of FIG. 1 may consist of computers 24, 26, 28, and 30 and telephones 34, 36, 38, and 40, all of which are connected to the LAN 42. The communication terminals 46–52 in the integrated voice and data ToL network system 12 of FIG. 1 may consist of computers 56, 58, 60, and 62 and telephones 66, 68, 70, and 72, all of which are connected to the LAN 74. The computers in each system are telephony-enabled computers. Each computer is preferably equipped with a telephony programming application interface (TAPI) that allows the computer to be used for telephony functions. The telephones are preferably digital telephones that are compatible with computer telephony protocols, although analog telephones with appropriate adapters can be used. While the telephones are shown as being connected to the LAN through the computers in each network system, the telephones can alternatively be connected directly to the LAN in each network system.

In the first embodiment, the gatekeeper 22 provides the computer telephony functionality for the ToL network system 10 and the gatekeeper 54 provides the computer telephony functionality for the ToL network system 12. In each network system, the computer telephony functionality includes managing call control within each network system and call control outside of the network system via the PSTN 44. In a preferred embodiment, the ToL network systems 10 and 12 also include messaging systems 73 and 75, such as voicemail systems.

The data server 32 in the ToL network system 10 is connected to provide traditional data accessibility. Similarly, the data server 64 in the ToL network system 12 is connected to provide traditional data accessibility. Each data server may contain information such as financial records, manufacturing schedules, and/or customer information. Although not shown, the network system 10 and network system 12 may be connected to additional systems that provide, for example, network control and/or access to broader data networks such as the Internet.

The above-described communication terminals 14–20 and gatekeeper 22 in ToL network system 10 and communication terminals 46–52 and gatekeeper 54 in ToL network system 12 are configured to provide extended caller-initiated privacy options via the data network 41. The caller-initiated privacy options that are the focus of the invention include preventing a call from being forwarded, transferred, or conferenced, and preventing a call from being conducted through a speaker phone of the called party. Additional caller-initiated privacy options include preventing voicemail messages from being transferred or conferenced, and preventing voicemail messages from being listened to via a hands-free speaker.

All of the privacy options are provided to ensure that an intended party is the only party that receives the private information. Although specific privacy options are disclosed and described in detail below, other privacy options may be implemented in network system 10 and network system 12. It should be noted that "privacy" as used herein refers to subject matter that is separate from the issues of network security, and particularly telecommunications security. Telecommunications security is related to preventing the unauthorized intrusion into a communications network, while privacy is related to ensuring that only the intended parties are involved in an information exchange in which unauthorized intrusion is not a primary issue. Security is typically considered at a network level, while privacy is a main consideration at an individual level.

Figure 2:
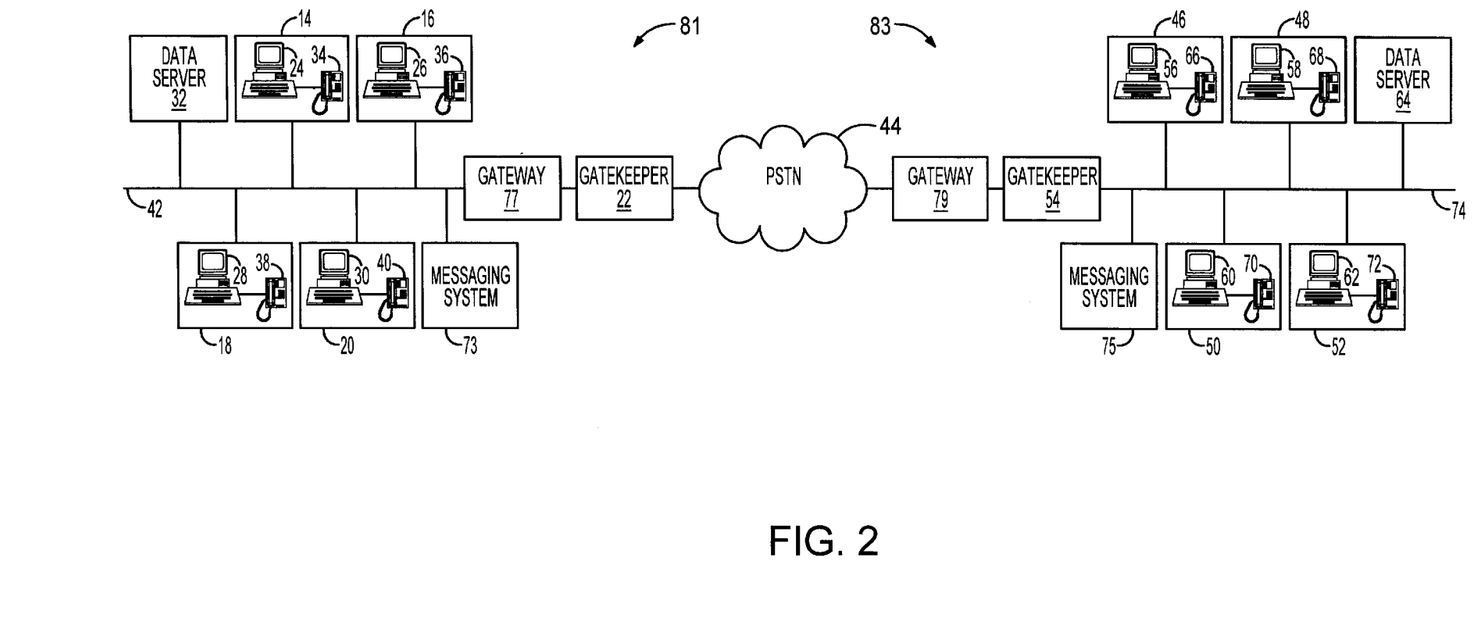
FIG. 2 is a depiction of two ToL network systems linked by gateways and the PSTN to provide privacy options in accordance with the invention.

Referring now to the logical depiction of FIG. 2, a second embodiment includes a pair of gateways 77 and 79 that are used to ensure signaling compatibility across the PSTN 44. The reference numbers from FIG. 1 are used for comparable components of FIG. 2. The components of the network systems 81 and 83 of FIG. 2 are generally the same as FIG. 1, since only ToL networks are shown in both embodiments. However, the use of PSTN connectivity requires signal operations that require the use of the gateways 77 and 79 or similar devices. The basic operations of the gateways are known in the art. The operations specific to providing privacy options will be described in combination with the embodiment of FIG. 3.

Figure 3:
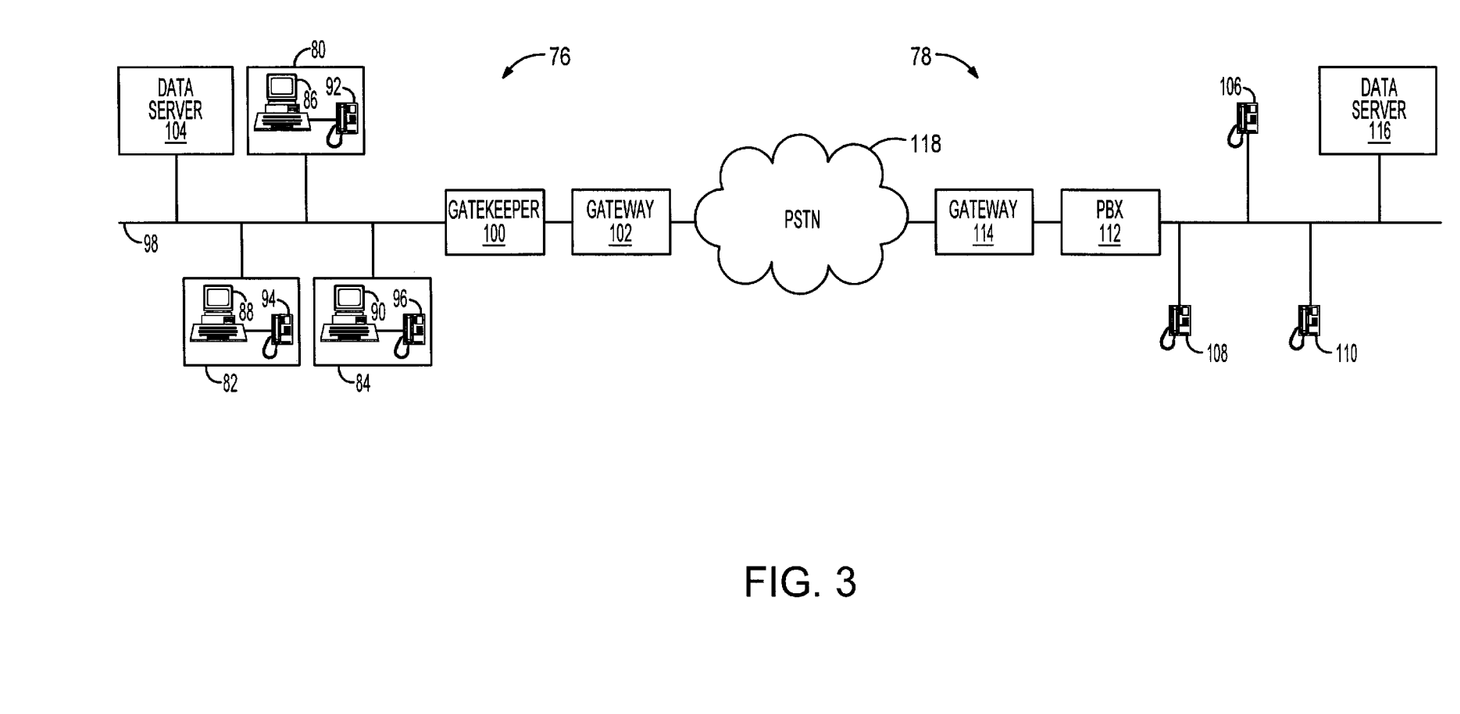
FIG. 3 is a depiction of a ToL network system and a PBX network system linked via the PSTN to provide privacy options in accordance with the invention.

FIG. 3 is a logical depiction of first and second network systems 76 and 78, respectively, which can be configured to provide privacy options to operate in accordance with the invention. The preferred system in network system 76 is a ToL system that includes communication terminals 80, 82, and 84, a gatekeeper 100, a gateway 102, and a data server 104. The preferred system in network system 78 is a PBX system that includes communication terminals (telephones) 106, 108, and 110, PBX 112, gateway 114, and data server 116. ToL network system 76 and PBX network system 78 simultaneously transfer non time-critical data (such as e-mail) and time-critical data (such as voice communications) across the PSTN 44 to each other.

The communication terminals 80, 82 and 84 in the integrated voice and data ToL network system 76 preferably consist of computers 86, 88, and 90 and telephones 92, 94, and 96, all of which are connected to the LAN 98. The computers are conventional computers which are configured to enable communications over the LAN and across the PSTN 118 to the communication terminals 106–110 of the integrated voice and data PBX network system 78. The communication terminals 106–110 of the PBX network system 78 are digital telephones which are configured to enable communications over the PBX 112 and across the PSTN 118 to the communications terminals 80, 82 and 84 of the ToL network system 76.

The gatekeeper 100 connected to the LAN 98 provides the computer telephony functionality for the ToL network system 76. The PBX 112 provides the computer telephony functionality for the PBX network system 78. The gatekeeper 100 and the PBX 112 also provide messaging systems, such as a voicemail system, although the messaging systems may be encompassed in other devices.

According to the third embodiment of FIG. 3, the communication terminals 80, 82 and 84 and the gatekeeper 100 located in the ToL network system 76, and the communication terminals 106–110 and the PBX 112 located in the PBX network system 78, are configured to provide extended call-initiated privacy options to each other via the PSTN 118 and the gateways 102 and 114. The gateway 102 of the ToL network system 76 controls the conversions necessary to ensure compatibility in the delivery of the privacy options passed from the ToL network system 76 to the PBX network system 78, which utilizes a different type of communication protocol system. Similarly, the gateways 77 and 79 of the embodiment of FIG. 2 are used to achieve compatibility.

Figure 4:
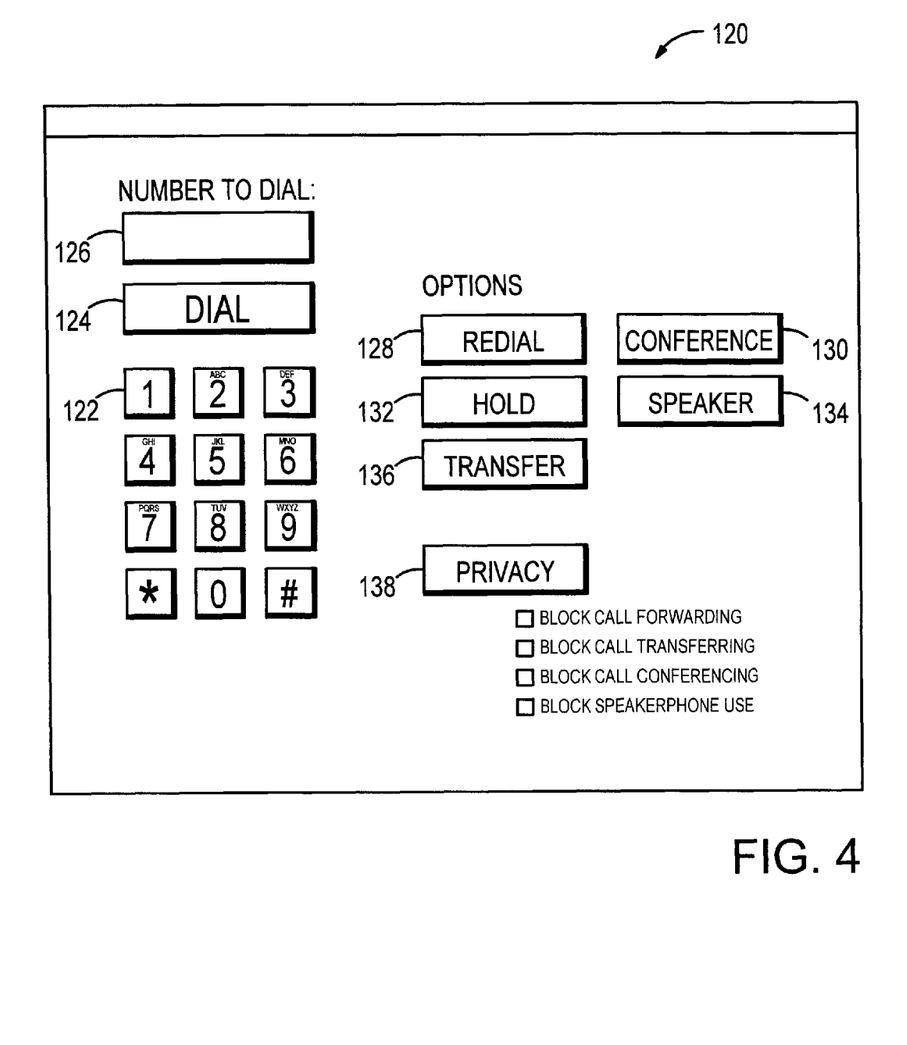
FIG. 4 is a depiction of a preferred call placement screen that is configured to provide privacy options in accordance with the ToL network systems in both embodiments of the invention.

FIG. 4 is a depiction of a preferred call placement screen 120 that is configured to implement the privacy options in the ToL network systems of all three embodiments of the invention. The call placement screen 120 includes call control buttons. The screen is the user interface of a call placement application resident in each of the computers of the communication terminals 14–20 and 46–52 in FIGS. 1 and 2 and communication terminals 80, 82 and 84 in FIG. 3. Although not shown, the telephones 106–110 of FIG. 3 can include feature codes (e.g., *21) and/or preprogrammed call control buttons to activate particular privacy options related to a call or a message. In an alternative embodiment for the communication terminals 106–110 in the PBX network system 78, menu-driven telephones can be used to activate particular privacy options.

In the preferred embodiment for the ToL network systems, the call placement screens include many traditional call control buttons, such as a standard telephone keypad 122, a dial button 124, and a display of the number to dial 126. The call placement screens may also include option buttons, such as redial 128, conference 130, hold 132, speaker 134, and transfer 136 buttons, that activate the corresponding functions. The call placement screens may also include a privacy button 138 and individually selectable privacy options. Preferably, the individually selectable privacy options in the ToL network systems and the PBX network system of all of the embodiments of the invention include: block-call-forwarding, block-call-transferring, block-call-conferencing, and block-speaker phone-use. Although four specific privacy functions are described, other privacy functions may be integrated into the privacy system of both embodiments of the invention. A calling party within a ToL network system can select a particular privacy option by, for example, directing a cursor to a desired privacy option selection box and clicking a computer mouse button. Alternatively, call placement options can be accessed through an interface integrated with the telephone.

Figure 5:
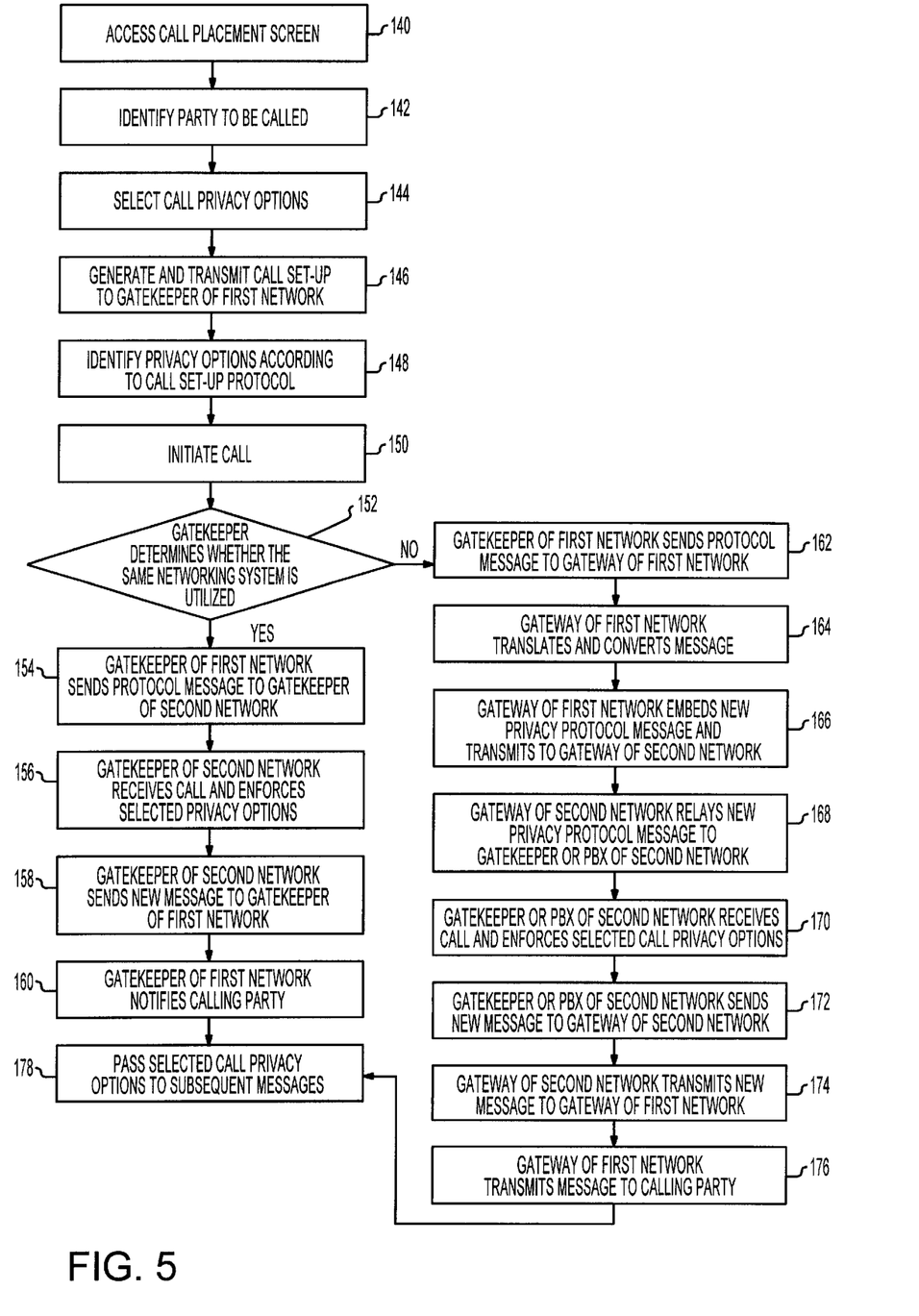
FIG. 5 is a process flow diagram of a method for implementing privacy options in accordance with both embodiments of the invention.

One of the preferred operations of the caller-initiated privacy system is described with reference to FIGS. 4 and 5. In this example, a calling party A wishes to place a call from a calling communication terminal of the first ToL network system 10 of FIG. 1 to a called party B at a target communication terminal of the second ToL network system 12. To initiate a call, the calling party A accesses the call placement screen 120 at step 140 via calling party A's communication terminal. The calling party A then identifies the called party B in step 142 by entering the number of the called party B. The calling party A has the option in step 144 of selecting any combination of the four privacy options that are displayed on the call placement screen 120. Once the caller-initiated privacy options are selected, the call placement application generates and transmits a call set-up protocol message to the gatekeeper 22 of the ToL network system 10, identifying the selected privacy options, as shown in steps 146 and 148. After call set-up is complete, the call is initiated in step 150.

Gatekeeper 22 then determines whether the target communication terminal utilizes the same network protocol system as the first telecommunication network in step 152. If gatekeeper 22 determines that the second telecommunication network utilizes the same network system, the gatekeeper 22, using an H.323 signaling command, sends the protocol message to gatekeeper 54 of the second telecommunication network, in step 154. Gatekeeper 54 receives the call within the parameters dictated by the selected call privacy options and enforces the selected privacy options in step 156.

For example, if the parameter selected by the caller A was to block the call from being forwarded, the gatekeeper. 54 determines whether the telephone calls received at the target communication terminal are being forwarded to a third terminal (e.g., a terminal of a third party C). If the calls are not being forwarded, then the call will be connected. On the other hand, if the calls are being forwarded, the call is rejected. In step 158, the gatekeeper 54 sends a specific message to gatekeeper 22, informing the gatekeeper 22 that the called party is forwarding the telephone calls to a third party C. Gatekeeper 22 then notifies the caller in step 160 that the target communication terminal is forwarding telephone calls to a third party C and, therefore, the call was rejected.

Another preferred operation of the caller-initiated privacy system of FIG. 3 is described with reference to FIGS. 4 and 5 for a calling party A who wishes to place a call from a calling communication terminal, located in the ToL network system 76, to a called party B at a target communication terminal, located in the PBX network system 78. To initiate a call in step 140, the calling party A accesses the call placement screen 120 via the calling party's communication terminal. The calling party A then identifies the called party B in step 142 by entering the number of the called party B. The calling party A has the option in step 144 of selecting any combination of the four privacy options that are displayed on the call placement screen. In step 146, the call placement application generates and transmits a call set-up protocol message to gatekeeper 100 in the ToL network system 76. This message identifies the selected privacy options, as shown in step 148. After call set-up is complete, the call is initiated in step 150.

Gatekeeper 100 then determines whether the second telecommunication network utilizes the same network protocol system as the first telecommunication network in step 152. Comparing the embodiments of the systems of FIGS. 1 and 2, the determination in step 152 is whether the connectivity utilizes the same protocol system. In the embodiment of FIG. 1, Internet Protocol (IP) addressing may be consistently used. However, in the embodiment of FIG. 2, the use of PSTN numbers is imposed. Therefore, the gateways 77 and 79 are employed using techniques known in the art. If the gatekeeper 100 determines in step 152 that the second telecommunication network is not a ToL network system, but rather a PBX network system, gatekeeper 100 will send the protocol message to gateway 102 of the ToL network system 76 in step 162. Gateway 102 then translates and converts the information in the protocol message to ensure the compatibility with the PBX network system in step 164.

After the conversion of the protocol message, in step 166, gateway 102 embeds the new privacy protocol message inside an ISDN user-to-user signaling command, which is transmitted to gateway 114 of the PBX network system. Alternatively, the new privacy protocol message can be embedded in a CorNet® ISDN signaling command. Gateway 114 receives the new privacy protocol message and, in turn, relays the privacy protocol message, containing the parameters dictated by the selected call privacy options, to the PBX 112 of the PBX network system in step 168. PBX 112 receives the call that has been established within the parameters dictated by the selected privacy options and enforces the selected privacy options in step 170. For the embodiment of FIG. 2, the gateway 79 receives the call within the established parameters and enforces the selected privacy options.

For example, if a caller A selected the privacy option of blocking call forwarding, after receiving the new protocol message, the PBX 112 determines whether the called party B at the target communication terminal is forwarding the incoming calls to the communication terminal of a third party C. If the called party B is forwarding the telephone calls to a third party C, the call is rejected, without ringing the party to whom the calls are being forwarded. In step 172, the PBX 112 sends a new protocol message to gateway 114, informing gateway 114 that the phone calls to the target communication terminal are being forwarded to a third party C. Gateway 114 converts the information in the new protocol message to ensure the compatibility with the ToL network system 76. After the conversion, gateway 114 encapsulates the new protocol message into an ISDN user-to-user signaling command, or a CorNet signaling command, and transmits the converted new protocol message to gateway 102 in step 174. In step 176, gateway 102 sends the converted message to gatekeeper 100, which then alerts the calling party at the calling communication terminal that calls are being forwarded.

In each preferred embodiment, during a call, the selected call privacy options of block-call-forwarding, block-call-transferring, and block-call-conferencing options are completely enforced within the gatekeeper or PBX of the called party's telecommunication network, eliminating the need for external enforcement. This is achieved because the gatekeeper or PBX coordinates all of the telephony functions. The privacy option of blocking speaker phone use is enforced cooperatively between the gatekeeper or PBX of the called party's telecommunication network and the respective target communication terminal, eliminating the need for external enforcement. That is, the target communication terminals are programmed to request permission from the gatekeeper or PBX of the target communication terminal's telecommunication network to activate a speaker phone at the target communication terminal. A request to activate a speaker phone will be denied if the block-speaker phone-use privacy option is active on the particular call. Alternative embodiments can be used to enforce the block-speaker phone-use privacy option locally at each target communication terminal.

In the specific examples of calling party A, located in the first telecommunication network, initiating a call with called party B, located in the second telecommunication network, the four privacy options are described separately in further detail. The block-call-forwarding privacy option prevents a call from being forwarded from a target communication terminal to a third party. For example, the called party B may set up his/her telephone so that incoming calls are automatically forwarded to an administrator while the called party B is in a meeting. This may pose a privacy breach if calling the party A believes he/she has contacted called party B, when in reality the call has been forwarded to the administrator for party B. With the block-call-forwarding function selected, calling party A's call will not be forwarded to a third party, as directed by called party B, and the calling party A will be notified that the called party has forwarded the phone calls received at the target communication terminal to a third party. Furthermore, the block-call-forwarding feature can be enhanced by allowing call forwarding only when permission is given by the caller of the calling communication terminal. The gatekeeper or PBX of the second telecommunication network, where the target communication terminal is located, could be configured to return a message to the gatekeeper of the first telecommunication network, identifying the third party to whom the phone was forwarded and asking whether the caller would like to continue with the call.

As a separate consideration, if the gatekeeper or PBX of the target telecommunication network does not support the block-call-forwarding feature, or any privacy option feature, it will not recognize the new privacy protocol message. Therefore, the gatekeeper or PBX either will not acknowledge the message or will respond that the protocol message is 'unknown.' The gatekeeper of the telecommunication network where the calling communication terminal is located can then inform the caller that the specific features are not supported by the second telecommunication network system and ask whether the caller would like to connect the call to the target communication terminal.

The block-call-conferencing privacy option prevents the calling party A from being conferenced into a multiparty call that includes a party other than the intended party. For example, the called party B may try to conference a third party into a conversation between parties A and B without calling party A's knowledge. The block-call-conferencing option will prevent this possible breach of privacy. In an alternative embodiment of this function, the system can be configured to prevent call monitoring that is often performed at call distribution centers to monitor employee performance. Thus, if the calling party A initiates a call with the called party B and the call is being monitored by a third party, the calling party A will either be notified of the third party's presence or the call will be canceled.

The block-speaker phone-use privacy option prevents the called party B from conducting a call initiated through a hands-free speaker phone. For example, when the block-speaker phone-use option is initiated by calling party A, the called party B will not be able to answer the incoming call with a speaker phone or switch the call to the speaker phone during the conversation. This privacy feature allows the calling party to prevent the conversation from being overheard by anyone within earshot of called party B's speaker phone. In an environment where many workers are located in close quarters, this feature can prevent inadvertent breaches of privacy.

In addition to applying the caller-initiated privacy options to a real-time voice communication between parties, the caller-initiated privacy options can be automatically transferred to subsequent voicemail and/or multimedia messages that are generated in relation to a call in step 178. In the case of transferring privacy options to subsequent voicemail messages and/or multimedia messages, the caller-initiated privacy options are chosen from the group consisting of preventing call transferring, preventing call conferencing, and preventing voice data from being listened to via a hands-free speaker. For example, when a call is initiated with certain privacy options selected, all of the selected privacy options are passed on to any message that is left for the called party. Specifically, if a call is initiated with the block-call-transferring privacy option selected, then a subsequent message is prevented from being transferred to other voicemail boxes within the second telecommunication network. Additionally, if a call is initiated with the block-speaker phone-use privacy option selected, then a message left as a result of the call is prevented from being broadcast through a speaker phone, regardless of when the message is played. Enabling a user to prevent messages from being played aloud via a speaker phone is important because the calling party will not otherwise have any control over privacy when the called party accesses the message. In the above-described examples, the selected privacy options are transferred to a message that is generated in response to a telephone call that is not answered. In another embodiment, the privacy options can be similarly applied to a message that is prerecorded by a sending party and then delivered to the voicemail box of a receiving party without attempting to make direct party-to-party contact.

Although the techniques of providing multiple caller-initiated privacy options are described with reference to a ToL network system and a PBX network system, the caller-initiated privacy options can be implemented in a PBX network system that is connected to a central office (CO) or in a CO alone. Additionally, although the operations of the third embodiment of FIG. 3 were described as initiated in the ToL network system, the operations can be initiated in the PBX network system or in any other type of networking system.

In an alternative embodiment, the privacy options may be configured to allow expanded access to call-related information. For example, a privacy option may allow a call to be transferred, but only to certain parties. Specifically, the block-call-transfer option could be configured to allow a call to be transferred within a particular department (e.g., the sales department), but not to other departments (e.g., the accounting department), thereby preserving the privacy of information within a limited group. In another alternative embodiment, the call privacy options can be applied separately to either a call or a message.

An advantage of the invention is that the privacy of a telephone call and/or a message can be controlled by the caller of the first telecommunication network before the call travels across telecommunications networks. Another advantage is that a caller can select from various levels of privacy, depending on the particular needs of the caller when he/she makes calls which travel across telecommunication networks.

What is claimed is:

1. A method for protecting call privacy across telecommunication networks comprising the steps of:
   initiating a process for establishing a call between a calling communication terminal located in a first telecommunication network and a target communication terminal located in a second telecommunication network;
   selecting among a plurality of privacy options available for assignment to said call, each of said privacy options being selected at said calling communication terminal and being associated with a limitation on call compatibility at said target communication terminal;
   assigning each selected privacy option to said call; and
   enforcing each of said selected privacy options assigned to said call completely within said second network, eliminating the need for external enforcement, said enforcing including disabling call control capability of said target communication terminal based on said selected privacy options;
   wherein said selecting includes selecting a privacy option that prevents said call between said calling communication terminal and said target communication terminal from being directed through a hands-free speaker phone that is related to said target communication terminal.

2. The method of claim 1 wherein said call between said calling communication terminal located in a first telecommunication network and said target communication terminal located in a second telecommunication network is connected via a Public Switched Telephone Network (PSTN).

3. The method of claim 1 wherein said step of assigning includes a step of identifying said selected privacy options using one of an Integrated Services Digital Network (ISDN) user-to-user signaling command and an H.323 command when said call is carried from a telephony over local area network (ToL) across to a different telecommunications network utilizing one of a private branch exchange (PBX) and a central office (CO) and when said call is carried from a ToL system across to another ToL system, respectively.

4. The method of claim 1 wherein said step of selecting includes selecting a privacy option that prevents call forwarding, said step of enforcing including disabling call forwarding of said call at said second telecommunication network.

5. The method of claim 4 wherein said steps of selecting and enforcing include returning a message from said second telecommunication network indicating that a selectable configuration at said second telecommunication network has been implemented such that calls to said target communication terminal are being forwarded to a third communication terminal.

6. The method of claim 5 wherein said step of returning a message from said second telecommunication network includes transmitting an identification of said third communication terminal to which each said call to said target communication terminal is forwarded.

7. The method of claim 5 wherein said step of returning a message from said second telecommunication network includes transmitting a request message to said calling communication terminal, said request message enabling said caller of said calling communication terminal to elect whether to proceed with forwarding said call to said third communication terminal.

8. The method of claim 4 wherein said steps of selecting and enforcing include returning at least one of a first message from said second telecommunication network indicating an unknown message has been transmitted to said second telecommunication network and a second message indicating that said second telecommunication network does not support said privacy option which disables call forwarding at said second telecommunication network.

9. The method of claim 8 wherein after said step of returning said second message from said second telecommunication network, said first communication network transmits an internal message informing said caller that said privacy option which disables call forwarding is not supported by said second telecommunication network.

10. The method of claim 9 wherein after said step of transmitting said internal message, said first telecommunication network transmits a request message to said calling communication terminal, said request message enabling said caller to elect whether to proceed with said call.

11. The method of claim 1 wherein said step of selecting includes selecting a privacy option that prevents call transferring, said step of enforcing including disabling call transfer of said call to a third communication terminal, wherein said disabling is implemented using resources of said second telecommunication network.

12. The method of claim 1 wherein said step of selecting includes selecting a privacy option that prevents call conferencing, said step of enforcing including disabling call conferencing of said call with a third communication terminal, wherein said disabling is implemented using resources of said second telecommunication network.

13. The method of claim 1 further including steps of:
   transferring assignment of said selected privacy options to a message that is generated and stored as a result of said call between said calling communication terminal and said target communication terminal; and
   enforcing said selected privacy options during subsequent manipulation of said message.

14. The method of claim 13 wherein said step of selecting among a plurality of privacy options includes a step of selecting any combination of privacy options, wherein said privacy options include preventing call and message forwarding, preventing call and message transferring, and preventing a call and message from being listened to through a speaker phone.

15. A method for protecting the privacy of voice data comprising the steps of:

selecting privacy options from among a plurality of privacy options that can be assigned to voice data transferred over at least two different networks, including a call-originating network and a call-receiving network, wherein said privacy options include at least two privacy options from the group consisting of: preventing call transferring, preventing call conferencing and preventing voice data from being listened to via a hands-free speaker, said selecting occurring at said call-originating network;

assigning said selected privacy options to said voice data that is transferred over said at least two different networks; and preventing said voice data from being manipulated in conflict with said selected privacy options, including enabling resources of said call-receiving network to enforce said selected privacy options.

16. The method of claim 15 further including a step of transferring said voice data over said at least two different networks from a calling communication terminal located in said call-originating network to a target communication terminal located in said call-receiving network as part of a real-time voice communication, said privacy options being related to disabling available call-control capabilities at said target communication terminal.

17. A method for protecting call privacy across telecommunication networks comprising the steps of:

initiating a process for establishing a call between a calling communication terminal located in a first telecommunication network and a target communication terminal located in a second telecommunication network;

selecting among a plurality of privacy options available for assignment to said call, including selecting a privacy option that blocks call monitoring from a third device, each of said privacy options being selected at said calling communication terminal and being associated with a limitation on call compatibility at said target communication terminal;

assigning each selected privacy option to said call; and enforcing each of said selected privacy options assigned to said call completely within said second network, eliminating the need for external enforcement, said enforcing including disabling call control capability of said target communication terminal based on said selected privacy options.

18. A method for protecting call privacy across telecommunication networks comprising the steps of:

initiating a process for establishing a call between a calling communication terminal located in a first telecommunication network and a target communication terminal located in a second telecommunication network;

selecting among a plurality of privacy options available for assignment to said call, including selecting any combination of privacy options that include preventing call forwarding, preventing call transferring, preventing call conferencing, preventing speaker phone use at said target communication terminal, and preventing call monitoring from a third device, each of said privacy options being selected at said calling communication terminal and being associated with a limitation on call compatibility at said target communication terminal;

assigning each selected privacy option to said call; and enforcing each of said selected privacy options assigned to said call completely within said second network, eliminating the need for external enforcement.

* * * * *